United States Patent [19]

Kranz et al.

[11] 3,886,441

[45] May 27, 1975

[54] ADAPTER FOR COUPLING A MEASURING INSTRUMENT TO AN ELECTRICAL IGNITION SYSTEM

[75] Inventors: Hans-Werner Kranz; Herbert Lucke, both of Regensburg, Germany

[73] Assignee: Siemens Aktiengesellschaft, Munich, Germany

[22] Filed: July 6, 1973

[21] Appl. No.: 376,940

[30] Foreign Application Priority Data
July 11, 1972 Germany.......................... 2234055

[52] U.S. Cl.................. 324/15; 324/16 S; 324/126
[51] Int. Cl............................................ G01r 13/42
[58] Field of Search......... 324/15, 16 R, 16 S, 16 T, 324/19, 126

[56] References Cited
UNITED STATES PATENTS
2,613,345  10/1952  Osterland.......................... 324/126

Primary Examiner—Stanley T. Krawczewicz
Attorney, Agent, or Firm—Kenyon & Kenyon Reilly Carr & Chapin

[57] ABSTRACT

An electrical adapter apparatus for coupling an electronic measuring instrument to the ignition system of an internal combustion engine. The adapter comprises an ohmic voltage divider consisting of two resistors coupled in series, and an electrically conductive annular ring disposed about and spaced apart from one of the resistors which forms a compensation capacitance in combination with one of the resistors of the voltage divider.

3 Claims, 10 Drawing Figures

PATENTED MAY 27 1975  3,886,441

SHEET 1

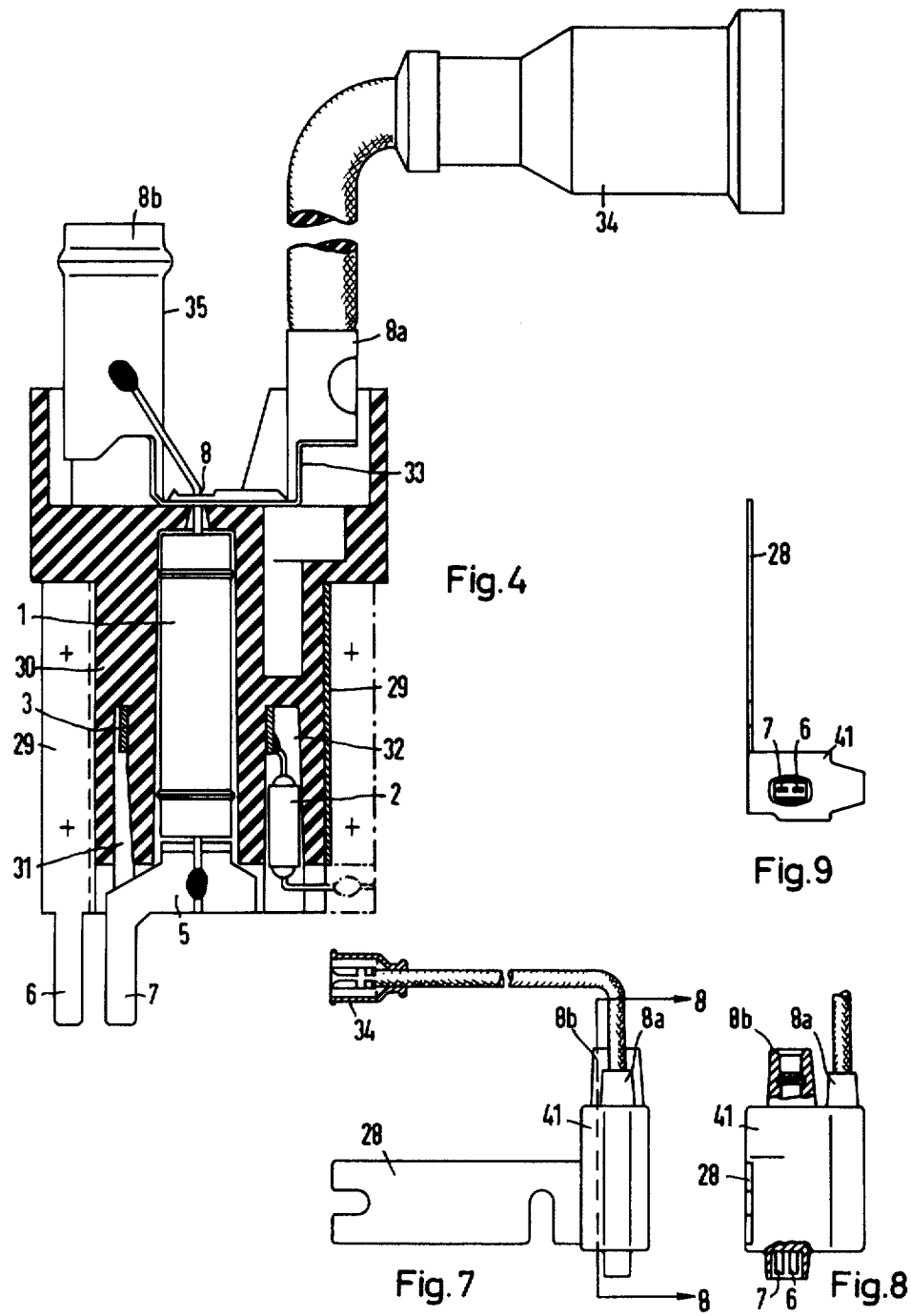

ADAPTER FOR COUPLING A MEASURING INSTRUMENT TO AN ELECTRICAL IGNITION SYSTEM

BACKGROUND OF THE INVENTION

1. Field of the Invention

The invention relates to an adapter apparatus for coupling an electronic measuring instrument to the ignition system of an internal combustion engine.

2. Description of the Prior Art

The ignition voltage signal supplied to the distributor of a four-cycle internal combustion engine has a normal characteristic waveform. Deviations from this normal waveform are indicative of malfunctions of the ignition system of the engine, typical of which are burning of the breaker contacts and electrical insulating material failure. Such malfunctions can be detected simply and easily by analyzing the waveform of the ignition voltage signal on an oscilloscope, or on some other electronic measuring instrument. The ignition voltage supplied to the distributor, however, can not be directly coupled to the measuring instrument, since, at its peak, the voltage is generally more than 30 kv. An adapter, which reduces the ignition voltage, by a ratio of, for example, 1000:1, without altering the voltage signal waveform supplied to the distributor, is thus required. Such an adapter can not be permitted to overload the ignition circuit and cause reduction of the ignition voltage level and/or alteration of the characteristic waveform of the ignition voltage signal. Adapters are available at present, but they are purely capacitive, and are frequency dependent.

SUMMARY OF THE INVENTION

It is therefore an object of the invention to provide a frequency — compensated adapter apparatus which includes an ohmic voltage divider for coupling an electronic measuring instrument to the ignition system of an internal combustion engine.

Accordingly, the invention provides an electrical adapter apparatus for coupling a measuring instrument to an ignition system, which comprises an ohmic voltage divider, including a pair of resistors coupled in series for dividing a voltage signal, and an electrically conductive member, disposed about and spaced apart from one of the resistors of the voltage divider, and coupled in series to both of the resistors. In one embodiment of the invention, the conductive member comprises an annular ring coaxially disposed about one of the resistors which forms a compensation capacitance coupled in parallel to the resistor about which it is disposed.

The invention achieves the objective of producing a frequency compensated ohmic voltage divider which compensates for the input impedance and the line capacitance of the electronic measuring instrument to which it is coupled. The adapter produced is simple in construction, and suitable for use with most types of internal combustion engine ignition systems. The geometric arrangement of the voltage divider of the adapter also obviates problems caused by the large voltage reduction across the compensation capacitance, which prohibits the use of discrete structural components.

BRIEF DESCRIPTION OF THE DRAWINGS

In the drawings, wherein similar reference numerals denote similar elements throughout the several views thereof:

FIG. 4 is a sectional view of an adapter apparatus constructed according to the invention;

FIG. 7 is a side view of another embodiment of an adapter apparatus constructed according to the invention, which includes an outer protective insulated cover;

FIG. 8 is a side view, partially in section, of the adapter apparatus taken along section 8—8 of FIG. 7; and FIG. 9 is a bottom plan view of the adapter apparatus of FIG. 7.

DETAILED DESCRIPTION

Figure 1:
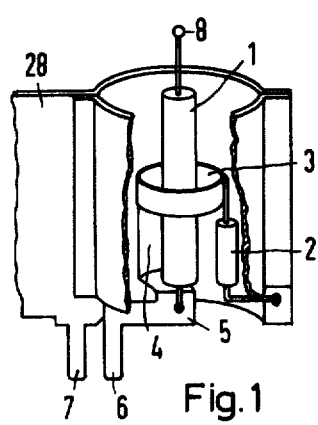
FIG. 1 is a perspective view, partially broken away, of an improved adapter apparatus constructed according to the invention.

Referring now to the drawings, and in particular to FIG. 1, there is shown an adapter apparatus constructed according to the invention, which comprises a first resistor 1, a voltage dividing resistor, and a second resistor 2, a measuring resistor, which in combination comprise an ohmic voltage divider. An annular conductive member 3 is disposed about and spaced apart from first resistor 1, and is connected to one terminal thereof by means of a conductive bridge 4. One terminal of resistor 2 is connected directly to member 3. In the embodiment of the invention illustrated, conductive member 3 comprises an annular ring which is coaxially disposed about cylindrical resistor 1. The ring is spaced apart from resistor 1 to form an insulating layer of air between the ring and resistor 1. One terminal of resistor 1 is soldered or welded to a base member 5, which is integrally formed with bridge 4, and couples the ring to resistor 1. Second resistor 2 is cylindrical in shape and has the other terminal thereof soldered or welded to an electrically conductive curved plate 28 which has a semi-circular end portion. Contact members 6 and 7 are coupled by base member 5 and plate 28, respectively, to first resistor 1 and second resistor 2. Ring 3 is preferably integrally formed with bridge 4, base member 5, and contact member 6. Ring 3 forms, in combination with the surface of the dividing resistor 1, a compensation capacitor which is coupled to contact member 6 and terminal 8 of first resistor 1 in parallel therewith. The reduced ignition voltage input signal to the electronic measuring instrument appears across contact members 6 and 7, whereas the voltage which is to be divided appears across terminal 8 and contact member 7.

Figure 2:
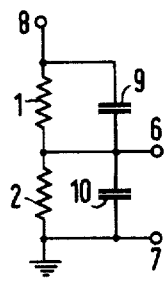
FIG. 2 is a schematic electrical diagram of an adapter apparatus constructed according to the invention.
Figure 2A:
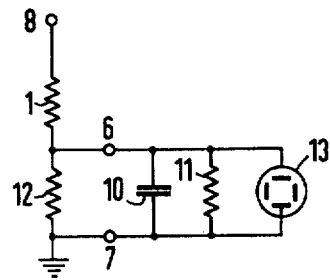
FIG. 2a is an equivalent schematic electrical diagram of the adapter apparatus of FIG. 2.

In FIGS. 2 and 2a, first and second resistors 1 and 2 are shown schematically. Capacitor 9 represents the compensation capacitance formed by annular ring 3 and resistor 1, and is coupled in parallel to resistor 1.

Capacitor 10, which is coupled in parallel to resistor 2, represents the capacitance of the electrical conductor which couples the ignition circuit to the electronic measuring instrument used to monitor the ignition signal waveform. The input impedance of the measuring instrument must be considered in calculating the measuring resistance of resistor 2. As is well known, the resistance value of resistor 2 can be calculated as follows:

$$R2 = (R11 \cdot R12) / (R11 + R12),$$

wherein $R11$ represents the input impedance of the measuring instrument, and $R12$ represents the mathematical partial resistance obtained after the desired dividing ratio is chosen.

The compensation capacitance $C9$ can be obtained from the following equation:

$$C9 = (R2/R1) \cdot C10,$$

wherein $C10$ represents the capacitance of the conductor coupling the measuring instrument to the ignition circuit.

The reference numerals of FIGS. 2 and 2a correspond to the above equations as follows:

R1 represents resistor 1;
R2 represents resistor 2;
R11 represents resistor 11;
R12 represents resistor 12;
C9 represents capacitor 9; and
C10 represents capacitor 10.

The values of the division resistance and the measuring resistance i.e., the resistance of resistor 1 and resistor 12, respectively, in FIG. 2a are obtained mathematically for the desired voltage division. In FIG. 2a, resistor 11 represents the input impedance of the measuring instrument 13.

Figure 3:
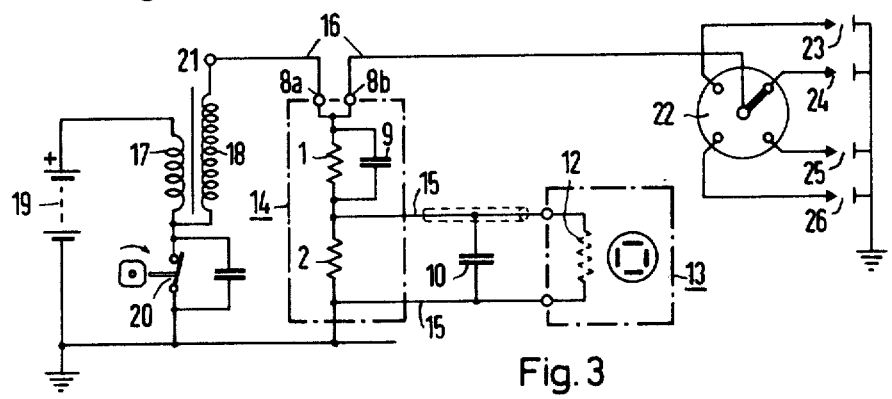
FIG. 3 is a schematic electrical diagram showing an adapter apparatus constructed according to the invention coupled to a measuring device and an ignition system of an internal combustion engine.

The adapter apparatus of the invention is illustrated in use in FIG. 3. Adapter 14 is coupled by means of terminals 8a and 8b, at the potential at terminal 8 of resistor 1, to the ignition circuit voltage line 16. Measuring instrument 13 is coupled by means of conductor 15 to contact members 6 and 7 of the adapter, and its input impedance 12 is illustrated by the broken lines in FIG. 3 since this resistance is considered in calculating the resistance of resistor 2. Battery 19 of the ignition system is coupled to an ignition coil, which has primary winding 17 and secondary winding 18, and a contact breaker 20, of the ignition system. The negative terminal of battery 19 is connected to the ignition circuit ground and functions in a conventional manner. In accordance with the position of the crankshaft of the automobile engine, secondary winding 18 of the ignition coil is periodically grounded by means of contact breaker 20, and a voltage is induced in the secondary winding when the contact breaker opens. This induced voltage comprises the ignition voltage signal which is transmitted from terminal 21 of the ignition coil to distributor 22 and spark plugs 23–26 of the engine. The connecting conductor coupling the adapter apparatus to the measuring instrument typically has, for example, a capacitance of approximately 100 pf/m. The measuring instrument typically has an input impedance of one megohm, or, alternatively, in the illustrated embodiment of the invention, 5 kilohms. A voltage division of 1,000:1 up to 10,000:1 is generally required for proper operation of the measuring instrument.

In the embodiment of the invention illustrated in FIG. 4, ring 3 is cylindrical in shape and first resistor 1 is mounted in a case 30 constructed of insulating material. The case includes a coaxial slot 31 having a widened portion 32 in which annular ring 3 and second resistor 2 are disposed. Case 30 may be constructed from synthetic insulation material as an extruded part. A curved sheet metal shield 29, illustrated as semicircular in shape, is disposed about insulating case 30 in order to prevent alteration of the compensation capacitance by adjacent metal parts of the adapter apparatus. A conductive connection member 33 is coupled to the end of first resistor 1 at terminal 8, and couples the resistor to a plug 34 which couples the ignition circuit voltage line to terminal 8a of member 33. Another terminal 8b forms part of another connection member 35 which is coupled to member 33. Member 35 may comprise a sleeve which is disposed over an upwardly extending contact member, and is coupled to the distributor of the ignition system. Terminal 8 is preferably welded or soldered to sleeve 35 in order to provide a good electrical connection.

Figure 5:
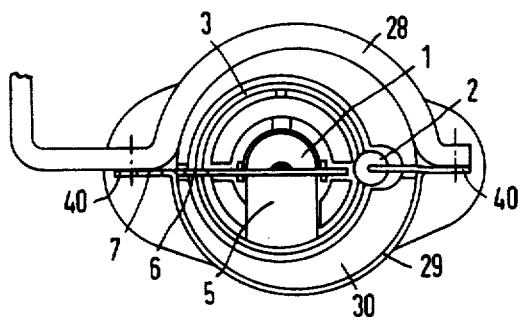
FIG. 5 is a bottom plan view of the adapter apparatus of FIG. 4.
Figure 6:
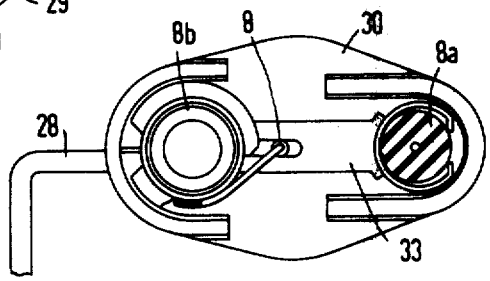
FIG. 6 is a top plan view of the adapter apparatus of FIG. 4.

In the embodiment of the adapter apparatus illustrated in FIG. 5, a sheet metal shield member 29 is mounted on plate 28 which has a curved end portion also illustrated as semicircular in shape, disposed opposite the shield member. Shield member 29 is connected to the plate 28 by connecting lugs 40 which extend outwardly from the ends thereof.

In the embodiment of the adapter illustrated in FIGS. 7–9, an outer protective covering 40, which is constructed of electrical insulating material, is disposed over the outer surface of case 30 of the adapter to increase the mechanical and the electrical endurance of the adapter.

While there have been described herein what are considered to be preferred embodiments of the invention, it will be clear to those persons skilled in the art that many changes and modifications may be made thereunto without departing from the invention, and it is therefore intended in the appended claims to cover all such changes and modifications as fall within the true spirit and scope thereof.

We claim:

1. An electrical adapter apparatus for coupling an electronic measuring instrument to the ignition system of an internal combustion engine, comprising:
   an ohmic voltage divider, including a pair of resistors coupled in series for dividing a voltage signal;
   an electrically conductive member comprising an annular ring, disposed about and spaced apart from one of said resistors of said voltage divider, and coupled in series to both of said resistors of said divider;
   electrically conductive contact members, coupled to said voltage divider resistors and said conductive member, for transmitting a signal representative of the ignition voltage to the electronic measuring instrument;
   a conductive base member coupled to said one of said voltage divider resistors and to one of said contact members;
   an electrically conductive bridge member coupled to said annular ring and said base member;
   a conductive plate member having a curved end portion disposed adjacent said annular ring and said resistors and coupled to the other one of said contact members; and a curved shield member, mounted on said plate member adjacent said voltage divider resistors.

2. An electrical adapter apparatus for coupling an electronic measuring instrument to the ignition system of an internal combustion engine, comprising:
   an ohmic voltage divider, including a pair of resistors coupled in series for dividing a voltage signal;
   an electrically conductive annular ring disposed about and spaced apart from one of said resistors of said voltage divider, and coupled in series between both of said resistors of said divider so as to lie in the current path therebetween;
   an electrically conductive contact member, coupled to said annular ring and said one of said resistors, for transmitting a reduced ignition voltage input signal to the electronic measuring instrument;
   another electrically conductive contact member coupled to the other one of said voltage divider resistors for transmitting said voltage input signal to the electronic measuring instrument;
   said conductive ring further comprising a conductive base member coupled to said one of said voltage divider resistors and to one of said contact members, an electrically conductive bridge member coupled to said annular ring and said base member, a conductive plate member having a curved end portion disposed adjacent said annular ring and said resistors and coupled to the other one of said contact members, and a curved shield member, mounted on said plate member adjacent said voltage divider resistors; and
   a case constructed of electrical insulation material disposed about said one of said voltage divider resistors, including an annular slot disposed therein for receiving said annular ring and said other one of said resistors of said voltage divider.

3. The apparatus as recited in claim 2, further comprising an outer protective covering, constructed of electrical insulation material, disposed on the outer surface of said case.

* * * * *